Feb. 10, 1970  H. VAN KAMPEN  3,494,332
POULTRY VISOR
Filed July 29, 1968

INVENTOR.
HENRY VAN KAMPEN

BY

ATTORNEY

United States Patent Office 3,494,332
Patented Feb. 10, 1970

3,494,332
POULTRY VISOR
Henry Van Kampen, 441 Mulberry Drive,
San Marcos, Calif. 92069
Filed July 29, 1968, Ser. No. 748,343
Int. Cl. A01k *37/00*
U.S. Cl. 119—97                                              8 Claims

ABSTRACT OF THE DISCLOSURE

A poultry visor comprising a flexible disc-like member of oval or round shape having a longitudinal slot positioned therein for fitting around the base of the poultry's comb in the mounted position and having a U-shaped wire at one end of the flexible member for projecting downwardly therefrom and fitting between the upper and lower parts of the beak thereby holding the flexible member in the mounted position in a manner to block the poultry's forward vision while not interfering with eating, drinking and breathing of the poultry.

BACKGROUND OF THE INVENTION

It is well known that poultry will engage in feather picking, cannibalism and egg picking. Since the poultry industry now utilizes small compartment pens for raising poultry, the aforesaid undesirable acts of poultry have become a major problem. In my U.S. Patent No. 3,352,288, I provided a poultry helmet that was a considerable improvement over the other known devices for reducing or eliminating the occurrence of cannibalism, feather picking and egg eating. In furtherance thereof, I have developed another improved poultry visor that is easily installed on the head of poultry and accomplishes in an improved manner the restriction of the forward vision of poultry without interfering with the eating, drinking and breathing of the poultry.

SUMMARY OF THE INVENTION

An embodiment of my invention comprises a thin flexible member of oval or circular shape that is made of stretchable plastic or other suitable materials that are slightly stretchable. The member has a longitudinal slot therein that is forced down over the comb of the poultry and fits against the poultry's head at the base of the comb. In this position the opaque flexible member obstructs the poultry's upward and forward vision, while permitting unobstructed side, rear and downward vision. While the poultry's comb, in mass, may be slightly larger than the slot, the flexible member expands sufficiently to pass the comb structure through the slot opening and contracts to a relatively close fit around the base of the comb.

A securing means comprises a U-shaped piece of wire having hooks on the upper ends of the sides that hook through openings in one end of the flexible member. These spaced openings are positioned on each side of the flexible member and are aligned normal to the slot and to the poultry's beak. The U-shape member pivots on the hook connections to the flexible member and thus pivots in a direction that is parallel with the poultry's beak. So in the mounted position, the U-shaped wire member pivots downwardly and fits between the upper and lower portions of the beak, where it holds the flexible member in the mounted position to obstruct the forward vision of the poultry. The poultry helmet or visor is thus mounted in an easy and direct fashion to the poultry and is held in this position without having to employ pins or the like projecting through the nostrils of the poultry. The poultry visor is secure on the poultry and yet may be removed if necessary without having to remove a nostril connection, which is often difficult. Further, should the poultry be successful in removing the poultry visor from the comb, the visor then falls off the bird and is not held to the beak by a connection through the nostrils.

It is therefore an object of this invention to provide a new and improved poultry visor.

It is another object of this invention to provide a new and improved poultry visor that may be quickly and easily mounted onto poultry without interfering with the poultry's nostrils.

It is another object of this invention to provide a new and improved poultry visor that is quickly and easily mounted onto poultry and that can be quickly and easily removed if desired.

It is another object of this invention to provide a new and improved poultry visor that is completely assembled prior to mounting on the bird and is mounted on the bird without further connecting or bending of parts of the poultry visor.

It is another object of this invention to provide a new and improved poultry visor that when mounted on poultry does not scoop-up drinking water and splash it on the poultry.

It is another object of this invention to provide a new and improved poultry visor that, should the poultry endeavor sufficiently to remove the poultry visor, it is removable without damage to the poultry and can be easily reinstalled on the poultry.

Other objects and advantages will be apparent to those familiar with the use of this invention as described in the following specification and accompanying drawings wherein like reference characters designate like parts throughout and in which.

Figure 1:
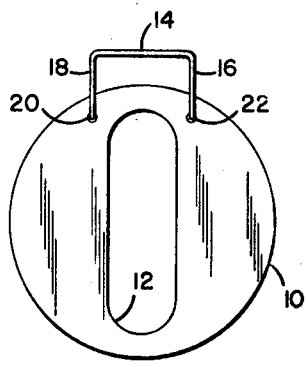
FIGURE 1 is a top plan view of an embodiment of this invention.

Referring now to FIGURE 1, a flexible member that may be made out of any suitable slightly stretchable material such as polyvinyl or other suitable stretchable plastics, has a longitudinal slot 12 therein. The longitudinal slot 12 fits over the comb 28 of the poultry and rests against the base of the comb. The flexible disc-like member may have an oval or circular shape as necessary to obstruct the forward vision of the poultry. A pair of apertures 20 and 22 in one end receives a handle wire 14 that has a U-shape with side portions 16 and 18. The ends of the side portions have hook members or circular ends that fit through the openings 20 and 22 and allow the handle member 14 to pivot thereon in a direction that is parallel with the longitudinal length of the slot 12.

OPERATION

Figure 2:
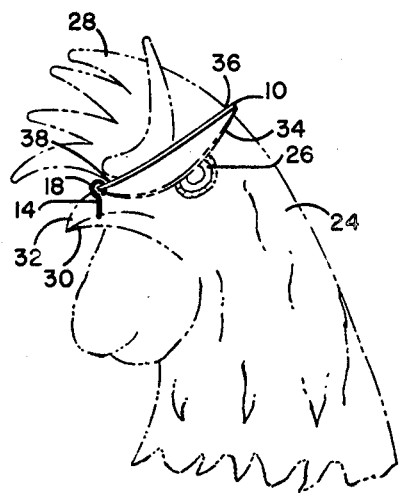
FIGURE 2 is a side view of an embodiment of the poultry visor of this invention installed on poultry.

The opaque, stretchable, and flexible disc-like member 10 is installed on the poultry by forcing the comb of the poultry through the longitudinal slot 12 so that the flexible member 10 rests against the head of the poultry with the slot 12 surrounding the base of the comb 28. While the upper portion of the comb 28 in some poultry may be slightly larger than the slot 12, the comb can be incrementally forced through the slot 12 and also the slot 12 can be expanded sufficiently to slip over the comb 28. The U-shaped handle wire 14, see FIGURE 2, then is pulled over the point of the beak 32 of the poultry and pushed into the opening 30 between the upper and lower portions of the beak. This wire, which has a diameter in the order of .03 inch, does not interfere with the breathing, eating or drinking of the poultry and there is no clogging of wet mash. As illustrated in FIGURE 2, the flexible member 10 can if desired, be formed to curve downwardly as illustrated along the dotted lines 34 to better obstruct the forward view of the poultry 24. In this position, the ends 36 and 38 of the flexible member 10 rests against the ends of the comb 28 and is held in this position by the U-shaped member 14.

Figure 3:
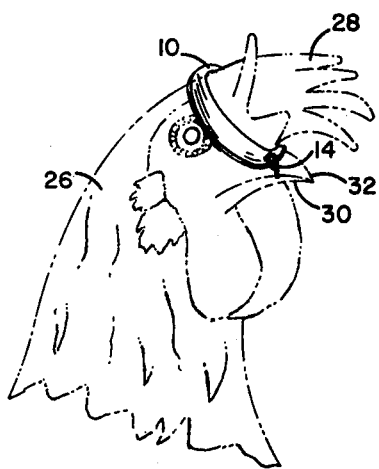
FIGURE 3 is still another view of the poultry visor of this invention mounted on poultry.

As illustrated in FIGURE 3, the poultry visor 10 is mounted on poultry 26 in the manner previously described and obstructs the forward vision of the poultry but not the downward vision, the side vision, or the rear vision of the poultry. It may be noted that there is no connection through the nostrils of the poultry, thus if the poultry would manage to pull the poultry visor off the comb, the visor would merely fall off and can then be easily replaced in the manner previously described.

Having described my invention, I now claim:

1. A poultry visor comprising,
   an opaque flexible and stretchable disc-like member,
   said member having a narrow medial slot therein for mounting said opening over the comb of the poultry to position said member around the comb at the base thereof, and
   a securing means located adjacent and between one edge of said slot and the edge of the disc-like member and secured to said flexible member for attaching the disc-like member to the beak and in position around the comb.

2. A poultry visor as claimed in claim 1 in which said slot extends substantially the length of said member.

3. A poultry visor as claimed in claim 1 wherein said securing means comprises a U-shaped pin like member with the ends being secured to said flexible member.

4. A poultry visor as claimed in claim 3 wherein,
   said flexible member having a pair of spaced openings adjacent one end which openings are aligned normal to the longitudinal length of said slot, and
   the ends of said U-shaped pin having hook portions that fit through said openings and allow said pin to pivot in a direction parallel with the longitudinal length of said slot.

5. A poultry visor as claimed in claim 4 wherein the bottom portion of said U-shaped pin is spaced in a pivoted position below said flexible member a distance sufficient to fit between the upper and lower parts of the beak.

6. A poultry visor as claimed in claim 1 in which said flexible member has an oval or circular shape with a relatively thin cross section.

7. A poultry visor as claimed in claim 6 in which said slot having a longitudinal length that is substantially greater than the largest diameter of said flexible member.

8. A poultry visor as claimed in claim 1 in which said flexible member being stretchable.

References Cited

UNITED STATES PATENTS 2,286,001   6/1942   Nichols et al. _____ 119—97
3,352,288   11/1967  Van Kampen _____ 119—97

ALDRICH F. MEDBERY, Primary Examiner